United States Patent
Shingu et al.

(10) Patent No.: US 10,277,831 B2
(45) Date of Patent: Apr. 30, 2019

(54) POSITION IDENTIFYING APPARATUS AND METHOD, PATH IDENTIFYING APPARATUS, AND NON-TRANSITORY COMPUTER READABLE MEDIUM

(71) Applicant: FUJI XEROX CO., LTD., Tokyo (JP)

(72) Inventors: Jun Shingu, Kanagawa (JP); Takeshi Onishi, Kanagawa (JP); Masatsugu Tonoike, Kanagawa (JP); Daisuke Ikeda, Kanagawa (JP); Yusuke Uno, Kanagawa (JP); Yusuke Yamaura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 42 days.

(21) Appl. No.: 15/341,426

(22) Filed: Nov. 2, 2016

(65) Prior Publication Data

US 2017/0278255 A1    Sep. 28, 2017

(30) Foreign Application Priority Data

Mar. 25, 2016  (JP) .................................. 2016-061987
Jun. 10, 2016  (JP) .................................. 2016-116165

(51) Int. Cl.
*G06K 9/00*    (2006.01)
*H04N 5/247*   (2006.01)
(Continued)

(52) U.S. Cl.
CPC ............. *H04N 5/247* (2013.01); *G06T 7/277* (2017.01); *G06T 7/292* (2017.01);
(Continued)

(58) Field of Classification Search
CPC . G06T 2207/10016; G06T 2207/30196; G06T 2207/30232; G06T 2207/30241; G06T 7/004; G06T 7/2093
See application file for complete search history.

(56) References Cited

U.S. PATENT DOCUMENTS 7,450,735 B1 * 11/2008 Shah ....................... G06T 7/292
                                                        348/143
9,794,525 B2 * 10/2017 Turetken ................ H04N 7/181
(Continued)

FOREIGN PATENT DOCUMENTS

JP    2013-196199 A    9/2013
JP    2014-089626 A    5/2014

OTHER PUBLICATIONS

Flueuret et al. ("Multicamera People Tracking with a Probabilistic Occupancy Map", 2008).*
(Continued)

*Primary Examiner* — Avinash Yentrapati
(74) *Attorney, Agent, or Firm* — Oliff PLC

(57) ABSTRACT

A position identifying apparatus includes multiple image capturers, an accumulating unit, a deriving unit, and an identifying unit. The image capturers capture images of predetermined image capturing ranges. The accumulating unit accumulates in time series movement track information of a person included in the images captured by the image capturers. The deriving unit derives, using the movement track information accumulated in the accumulating unit, for each image position in an image captured by any one of the image capturers, a probability that, at a same time as a time at which a person is image-captured at the image position, a person is image-captured at each image position in an image captured by another one of the image capturers. The identifying unit identifies, from the probability derived by the deriving unit, an image position common to the images captured by the image capturers.

8 Claims, 14 Drawing Sheets

(51) Int. Cl.
  *H04N 5/232* (2006.01)
  *G06T 7/277* (2017.01)
  *G06T 7/292* (2017.01)
(52) U.S. Cl.
  CPC ............... *H04N 5/23219* (2013.01); *G06T 2207/20021* (2013.01); *G06T 2207/30196* (2013.01); *G06T 2207/30232* (2013.01); *G06T 2207/30241* (2013.01)

(56) References Cited

U.S. PATENT DOCUMENTS

| | | | | |
|---|---|---|---|---|
| 2004/0252194 | A1* | 12/2004 | Lin | G08B 13/19645 348/169 |
| 2012/0046044 | A1* | 2/2012 | Jamtgaard | H04W 4/029 455/456.1 |
| 2013/0177200 | A1* | 7/2013 | Fleuret | G06T 7/20 382/103 |
| 2015/0294159 | A1* | 10/2015 | Takahashi | H04N 7/181 382/103 |
| 2016/0259975 | A1* | 9/2016 | Saptharishi | G06K 9/00771 |

OTHER PUBLICATIONS

Wang ("Intelligent multi-camera video surveillance: A review", 2013).*
Khan et al. ("Consistent Labeling of Tracked Objects in Multiple Cameras with Overlapping Fields of View", 2003).*
Mittal et al. ("M2Tracker: A Multi-View Approach to Segmenting and Tracking People in a Cluttered Scene", 2003).*
Mittal, Anurag, and Larry S. Davis. "M 2 tracker: a multi-view approach to segmenting and tracking people in a cluttered scene." International Journal of Computer Vision 51.3 (2003): 189-203.*
Fleuret, Francois, et al. "Multicannera people tracking with a probabilistic occupancy map." IEEE transactions on pattern analysis and machine intelligence 30.2 (2008): 267-282.*

* cited by examiner

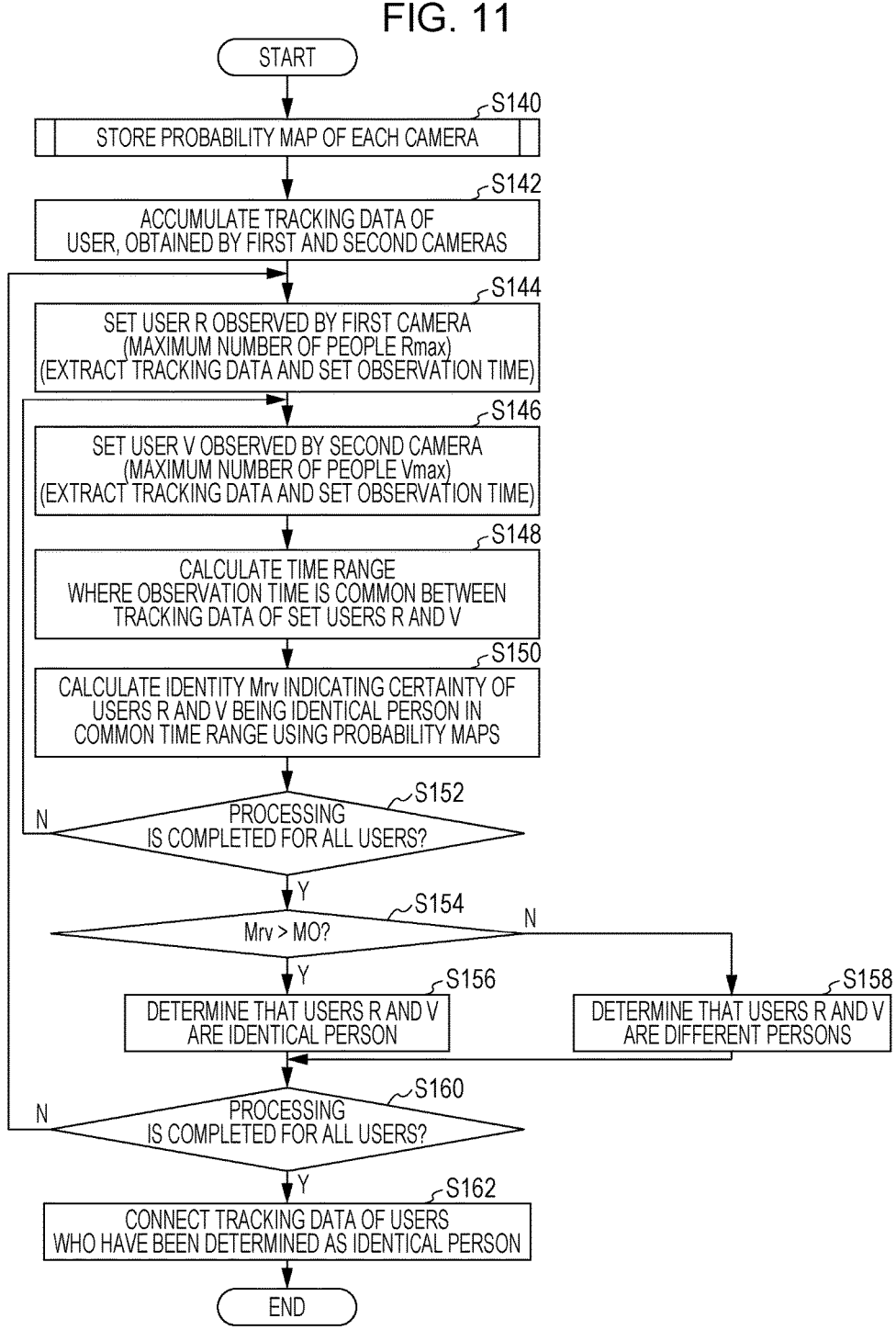

POSITION IDENTIFYING APPARATUS AND METHOD, PATH IDENTIFYING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Applications No. 2016-061987 filed Mar. 25, 2016 and No. 2016-116165 filed Jun. 10, 2016.

BACKGROUND

Technical Field

The present invention relates to a position identifying apparatus and method, a path identifying apparatus, and a non-transitory computer readable medium.

SUMMARY

According to an aspect of the invention, there is provided a position identifying apparatus including multiple image capturers, an accumulating unit, a deriving unit, and an identifying unit. The image capturers capture images of predetermined image capturing ranges. The accumulating unit accumulates in time series movement track information of a person included in the images captured by the image capturers. The deriving unit derives, using the movement track information accumulated in the accumulating unit, for each image position in an image captured by any one of the image capturers, a probability that, at a same time as a time at which a person is image-captured at the image position, a person is image-captured at each image position in an image captured by another one of the image capturers. The identifying unit identifies, from the probability derived by the deriving unit, an image position common to the images captured by the image capturers.

BRIEF DESCRIPTION OF THE DRAWINGS

Exemplary embodiments of the present invention will be described in detail based on the following figures, wherein:

FIG. 11 is a flowchart illustrating an example of the flow of a path identifying process according to a third exemplary embodiment;

DETAILED DESCRIPTION

Hereinafter, an example of a position identifying apparatus according to exemplary embodiments of the present invention will be described in detail with reference to the drawings.

First Exemplary Embodiment

Figure 1:
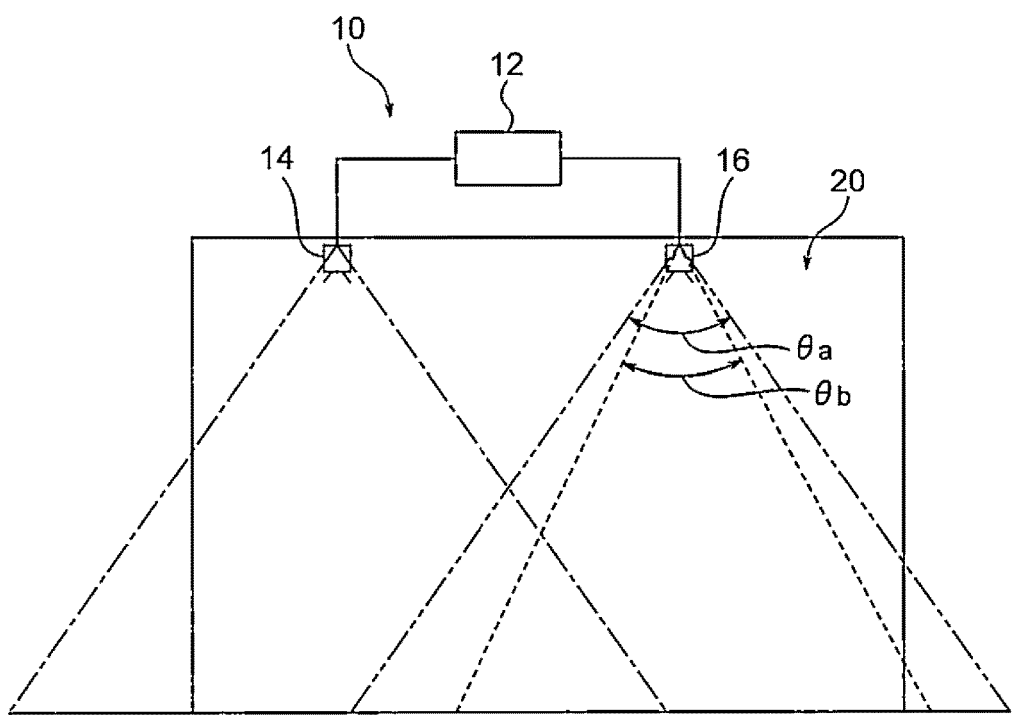
FIG. 1 is an image diagram illustrating an example of an environment where a position identifying apparatus according to a first exemplary embodiment is usable.

FIG. 1 is a schematic diagram, seen from the front side, of an example of an environment where multiple image capturers capture images of the interior of a facility such as a store, where a position identifying apparatus 10 according to a first exemplary embodiment is usable. In the first exemplary embodiment, an image capturing position common to the multiple image capturers is identified by tracking a user who moves within the facility from the captured images.

As illustrated in FIG. 1, the position identifying apparatus 10 includes a control device 12 to which a first camera 14 and a second camera 16 are connected. FIG. 1 illustrates an example of an environment where the first camera 14 and the second camera 16 are located on the ceiling of a facility 20 such as a store. The first exemplary embodiment will discuss the case where the first camera 14 and the second camera 16 use an image capturing lens such as a fisheye lens using an equidistant projection method in order to capture an extensive image of the interior of the facility 20. However, the image capturing lens of the first camera 14 and the second camera 16 is not limited to a fisheye lens, and a wide-angle lens or a standard lens is also usable.

Note that the first camera 14 and second camera 16 are located such that their image capturing ranges at least partly overlap each other. However, the first camera 14 and the second camera 16 are located after substantially defining image capturing directions, without making the detailed initial settings of the cameras, such as setting the angle of view or image capturing range. For example, as illustrated in FIG. 1, at the time of setting the second camera 16, the image capturing range of the second camera 16 may be different depending on whether the angle of view at the time of setting is the angle of view θa or the angle of view θb. This is because the detailed initial settings of the first camera 14 and the second camera 16 become unnecessary by matching the first camera 14 and the second camera 16, which will be described in detail later.

Although the first exemplary embodiment will discuss the case of using two cameras, i.e., the first camera 14 and the second camera 16, the number of cameras is not limited to two and may be three or greater. The locations of the cameras are not limited to the ceiling of the facility 20, and the cameras may be located on a wall or located standing upright on the floor.

Figure 2:
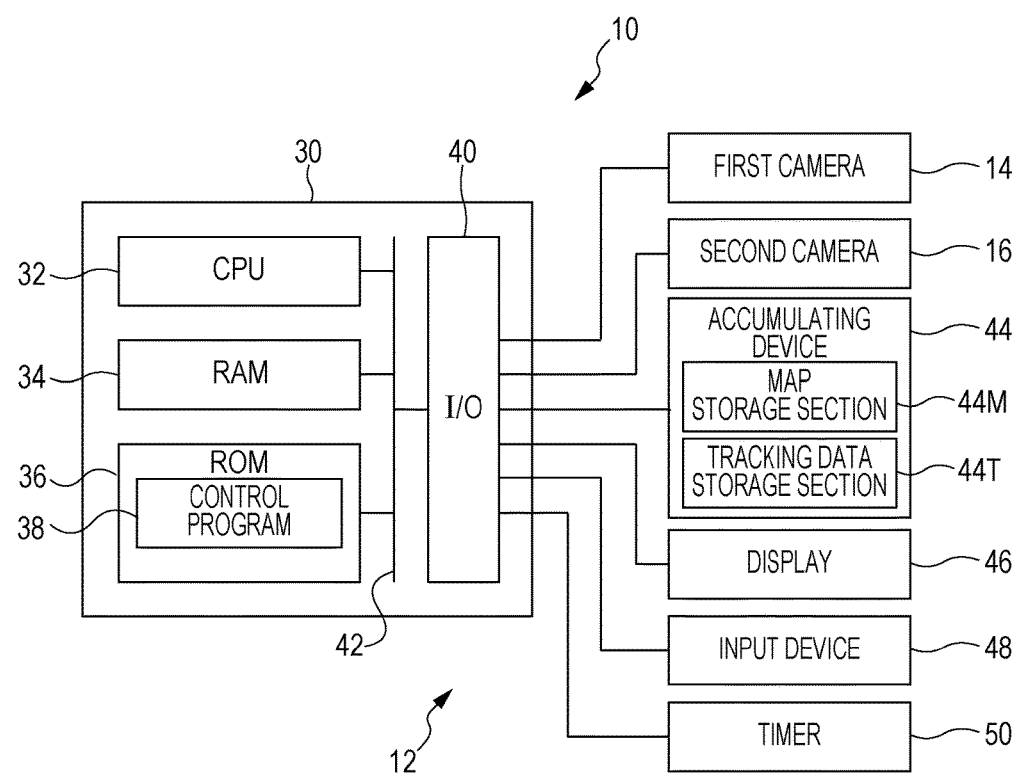
FIG. 2 is a block diagram illustrating an example of a computer capable of realizing a control device according to the first exemplary embodiment.

FIG. 2 illustrates an example of a computer capable of realizing the control device 12 as a computer 30. The computer 30 includes a central processing unit (CPU) 32, a random-access memory (RAM) 34, a read-only memory (ROM) 36, and an input/output port (I/O) 40, and these are connected to one another via a bus 42. An accumulating device 44, a display 46, an input device 48 such as a keyboard, and a timer 50 that indicates the current time are also connected to the I/O 40. The first camera 14 and the second camera 16 are also connected to the I/O 40.

The accumulating device 44 may be realized with a hard disk drive (HDD) or a non-volatile flash memory. In the accumulating device 44, a map storage section 44M and a tracking data storage section 44T are set, which will be described in detail later. The map storage section 44M is an area for storing a probability map that indicates the certainty of positions in captured images being a common position between the first camera 14 and the second camera 16. The tracking data storage section 44T is an area for storing time-series data (coordinates on a captured image and time information) indicating the position of a user in a captured image. The ROM 36 stores a control program 38 for causing the computer 30 to function as the control device 12. The CPU 32 reads the control program 38 from the ROM 36, expands it in the RAM 34, and executes processing. In doing so, the computer 30, which has executed the control program 38, operates as the control device 12 illustrated in FIG. 1.

Next, the operation of the computer 30 functioning as the control device 12 will be described.

Figure 3:
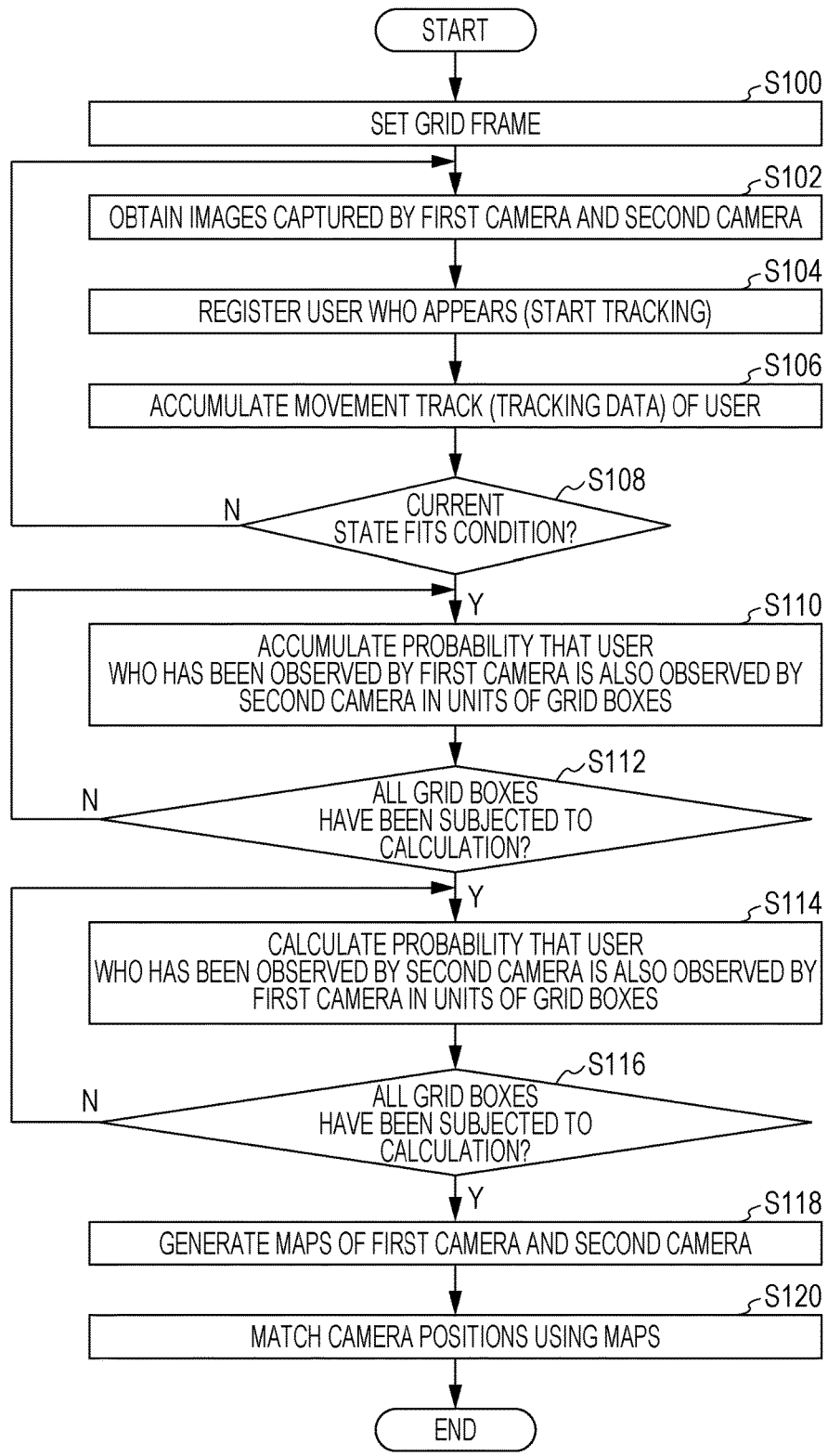
FIG. 3 is a flowchart illustrating an example of the flow of a position identifying process according to the first exemplary embodiment.

FIG. 3 illustrates an example of the flow of a position identifying process performed by the computer 30 functioning as the control device 12 when the CPU 32 executes the control program 38. The CPU 32 executes the processing routine illustrated in FIG. 3 in response to an instruction given by the user or periodically.

In step S100, the CPU 32 sets a grid frame for each of the first camera 14 and the second camera 16. Step S100 is executed to reduce the amount of calculation in the position identifying process. To execute the position identifying process in more detail, it is unnecessary to set a grid frame.

Figure 4:
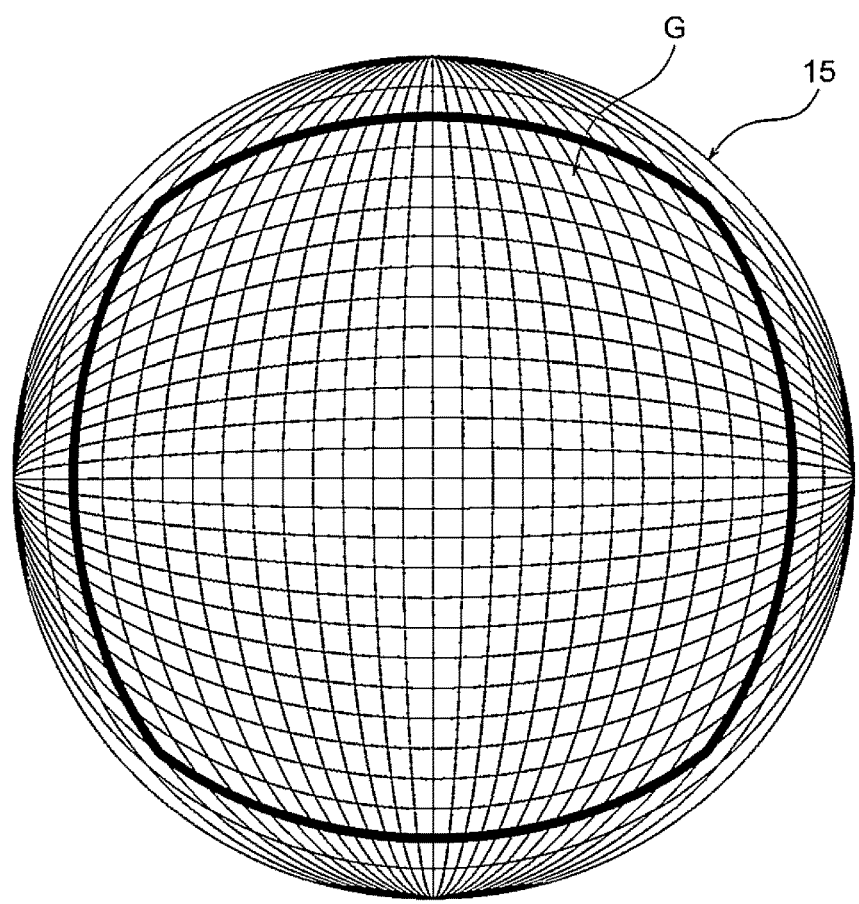
FIG. 4 is an image diagram illustrating an example of a grid frame set to an image captured by a first camera according to the first exemplary embodiment.
Figure 5:
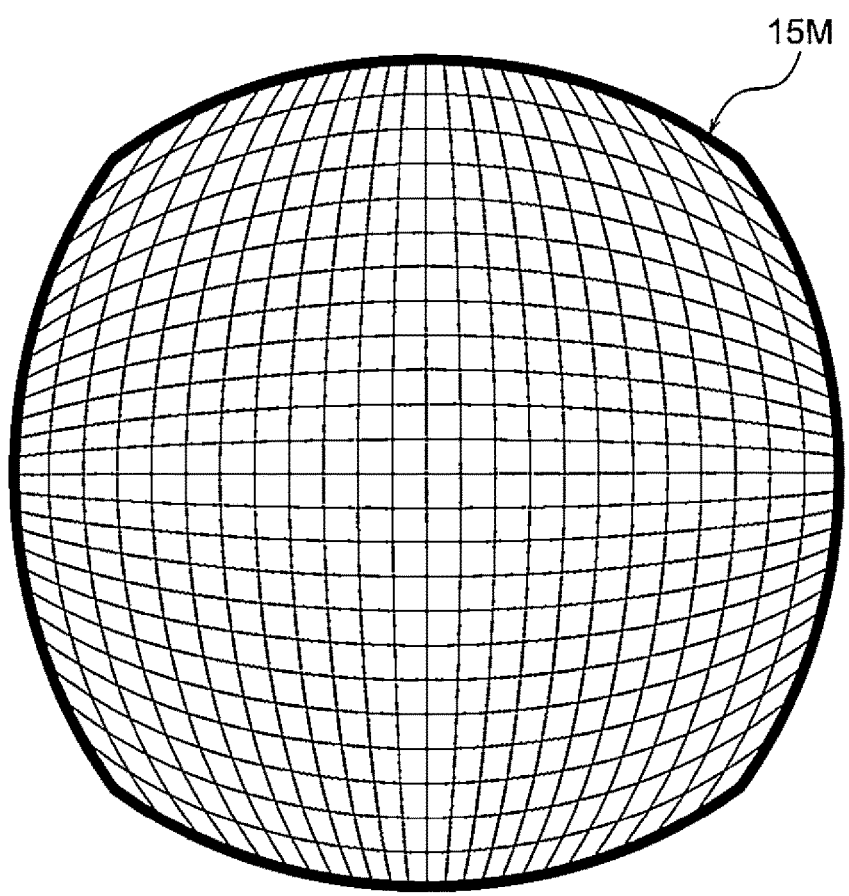
FIG. 5 is an image diagram illustrating an example of a grid frame set to an image captured by the first camera according to the first exemplary embodiment.

FIG. 4 illustrates an example of a grid frame 15 with multiple grid boxes G, which is set to an image captured by the first camera 14. An image captured by the first camera 14, which is captured with an image capturing lens such as a fisheye lens, is substantially circular. The grid frame 15, which is set to the image captured by the first camera 14, is defined on the basis of design data such as a lens distortion coefficient of the first camera 14 such that the area of each grid box G becomes identical on the real plane. To further reduce the amount of calculation in the position identifying process according to the exemplary embodiment, a grid frame 15M, which will be set to the interior of a predetermined main area (area indicated by a bold line in FIG. 4) of the image captured by the first camera 14, is used as the grid frame 15 to be set to the image captured by the first camera 14. FIG. 5 illustrates the grid frame 15M to be set to the image captured by the first camera 14. In the following description, a grid frame to be set to an image captured by the second camera 16 will be described as a grid frame 17M.

Next in step S102 illustrated in FIG. 3, the images captured by the first camera 14 and the second camera 16 are obtained. In next step S104, a user who newly appears in each captured image is detected by image processing of the related art. The detected user is given a user identification (ID), and tracking of the user with the given user ID starts. This tracking is the process of obtaining, as the user's movement track, a state where the user's position in the captured images changes as the user moves. In next step S106, the movement track of the user who is in the captured images is accumulated in the accumulating device 44.

In the exemplary embodiment, the representative positional coordinates of the user's predetermined portion (such as the head) in each of the captured images are obtained in time series as the user's movement track, and tracking data serving as information that indicates the movement track is accumulated in the accumulating device 44. As the tracking data, coordinates on each obtained captured image that indicate the position of the user's head in the captured image and time information at which the captured image is obtained are accumulated in association with each other. In short, in step S106, the current time is obtained from the timer 50, and the user's positional coordinates tracked by each of the first camera 14 and the second camera 16 are accumulated in association with the current time in the accumulating device 44. Specifically, the tracking data is stored in the tracking data storage section 44T set in the accumulating device 44. Therefore, the tracking data indicating the user's position in time series in each captured image is accumulated.

Figure 6A:
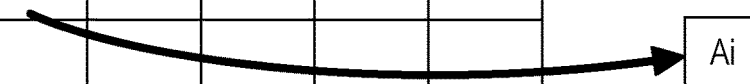
FIGS. 6A and 6B are image diagrams each illustrating an example of tracking data accumulated in an accumulating device according to the first exemplary embodiment.
Figure 6B:
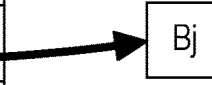

FIGS. 6A and 6B each illustrate an example of the tracking data accumulated in the accumulating device 44. FIG. 6A illustrates tracking data obtained by the first camera 14, and FIG. 6B illustrates tracking data obtained by the second camera 16. Although FIGS. 6A and 6B illustrate an exemplary case where coordinates indicating the position of the user's head in each captured image are accumulated, instead of the coordinates on the captured image, information indicating the position of a grid box G within a grid frame containing the coordinates may be accumulated. In FIG. 6A, the position of a grid box G of the first camera 14 is represented as "Ai". In FIG. 6B, the position of a grid box G of the second camera 16 is represented as "Bj".

Figure 8:
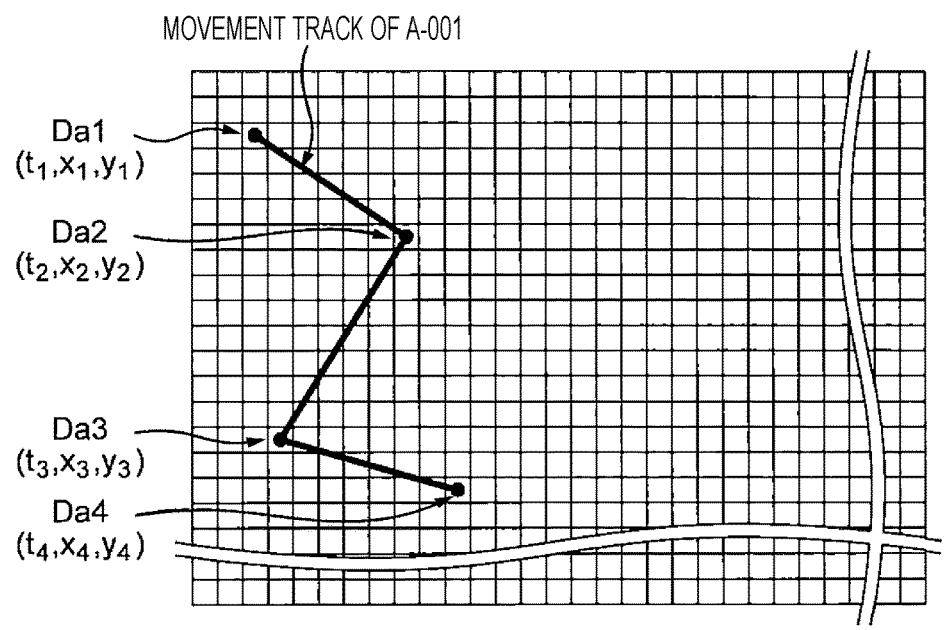
FIG. 8 is an image diagram illustrating an example of a movement track based on the tracking data of the first camera.
Figure 9:
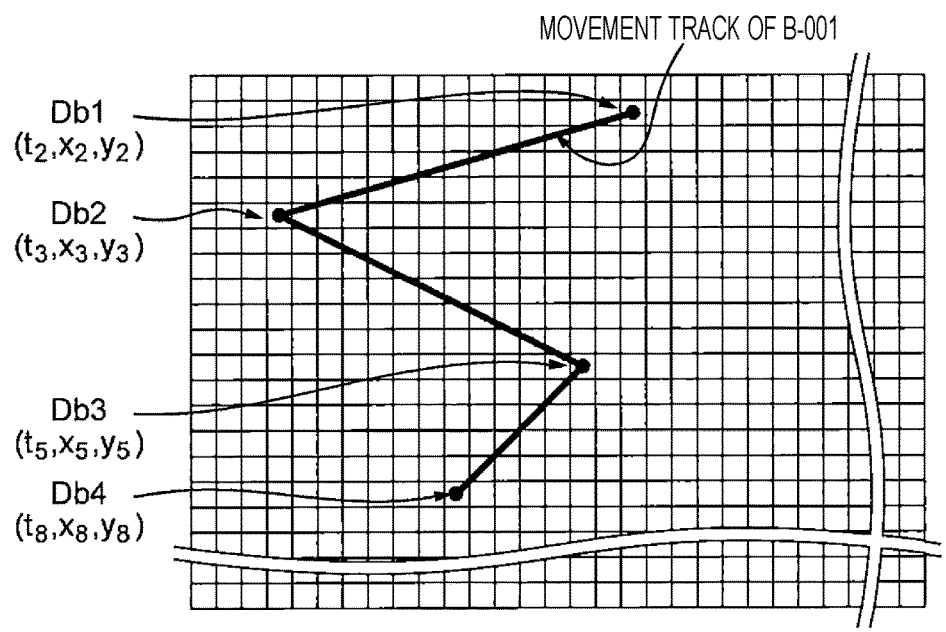
FIG. 9 is an image diagram illustrating an example of a movement track based on the tracking data of a second camera.

FIG. 8 illustrates an example of the movement track of a user (ID: A-001) based on the tracking data of the first camera 14. FIG. 9 illustrates an example of the movement track of a user (ID: B-001) based on the tracking data of the second camera 16. FIGS. 8 and 9 each illustrate an image where a grid frame is set to a captured image with an equal vertical and horizontal magnification ratio, which is obtained as a result of performing coordinate conversion such that the grid frame becomes one where each grid box G becomes rectangular on the real plane, on the basis of design data such as the distortion coefficient of the image capturing lens, for example. In FIG. 8, the position of the user's head is indicated by nodes Da1 to Da4. In FIG. 9, the position of the user's head is indicated by nodes Db1 to Db4. In the examples illustrated in FIGS. 8 and 9, no corresponding relationship is found between the movement track of the user (ID: A-001) based on the tracking data of the first camera 14 and the movement track of the user (ID: B-001) based on the tracking data of the second camera 16.

Next, as illustrated in FIG. 3, the CPU 32 determines in step S108 whether the current state fits a predetermined condition. In the exemplary embodiment, a time period for accumulating tracking data in the accumulating device 44, such as one week, is defined as the predetermined condition.

In other words, it is determined affirmative in step S108 when one week elapses from time t1, at which accumulation of tracking data in the accumulating device 44 starts, to time tm at the end (FIG. 6). When it is determined negative in step S108, the CPU 32 returns to step S102 and repeats accumulating tracking data.

When it is determined affirmative in step S108, in steps S110 to S118, the CPU 32 generates, for each of the first camera 14 and the second camera 16, a map indicating the certainty that a user who is image-captured by one of the first camera 14 and the second camera 16 is also image-captured by the other camera.

First in step S110, the CPU 32 calculates the probability that a user who has been observed by the first camera is also observed by the second camera 16 in units of grid boxes of the grid frame 15M set to the image captured by the first camera 14. Specifically, using tracking data accumulated in the accumulating device 44, when a user is observed in a particular grid box Ai set in an image captured by the first camera 14, the CPU 32 calculates the probability P(Ai, Bj) that the user is also observed in a particular grid box Bj set in an image captured by the second camera 16. The CPU 32 repeatedly calculates the probability P for each of multiple grid boxes set in the image captured by the first camera 14; that is, the CPU 32 repeats the processing in step S110 until it is determined affirmative in step S112.

In doing so, the corresponding relationship between grid boxes included in an overlapping image capturing area of the first camera 14 and the second camera 16 may be identified. In other words, when a user is standing at a certain position in the overlapping image capturing area, that user is image-captured in both a certain grid box (grid box Ai) of the first camera 14 and a corresponding grid box (grid box Bj) in an image captured by the second camera 16. That is, when a person is image-captured in the grid box Ai of the first camera 14, that same person is supposed to be image-captured in the grid box Bj in an image captured by the second camera 16 at the same time point. Therefore, when the object of interest at a certain position in an image captured by one of two cameras is image-captured, the probability of the object of interest being image-captured is obtained in units of areas obtained by dividing an image captured by the other camera. At a corresponding position, the probability of the object of interest being image-captured is detected to be high. Detection of such probabilities enables detection of corresponding positions serving as an identical position in images captured by multiple cameras.

An example of the calculation of the probability P will be described. At first, an arbitrary grid box Ai set in an image captured by the first camera 14 is identified. The time at which a user was observed in the identified grid box Ai is identified on the basis of tracking data obtained by the first camera 14. From tracking data obtained by the second camera 16 at the same time as the identified observation time, a grid box where the user was observed by the second camera 16 is derived. A value that has the derived total number of grid boxes of the second camera 16 as the denominator and the number of derived grid boxes as the numerator is obtained as the value of the probability P(Ai, Bj). The above processing is performed for each of grid boxes set in the image captured by the first camera 14. In doing so, the probability P(Ai, Bj) indicating the degree of certainty that a user who has been observed in the grid box Ai of the first camera 14 is also observed in the grid box Bj of the second camera 16 may be calculated.

Next, the probability P(Bj, Ai) of a grid box of the first camera 14 with respect to a grid box of the second camera 16 is calculated. In other words, in step S114, like steps S110 and S112, in units of grid boxes of the grid frame 17M set to an image captured by the second camera 16, the CPU 32 repeatedly calculates the probability that a person observed by the second camera 16 is also observed by the first camera 14, until it is determined affirmative in step S116.

Next in step S118, the CPU 32 generates a probability map of the first camera 14 on the basis of the probability P(Ai, Bj) in units of grid boxes, calculated in step S110, generates a probability map of the second camera 16 on the basis of the probability P(Bj, Ai) in units of grid boxes, calculated in step S114, and stores the probability maps in the accumulating device 44. In other words, the CPU 32 stores probability maps indicating the certainty of positions in images captured by the first camera 14 and the second camera 16 being a common position in the map storage section 44M set in the accumulating device 44. Specifically, the certainty of each of all grid boxes of the second camera 16 with respect to each grid box of the first camera 14 is stored as the probability map of the first camera, and the certainty of each of all grid boxes of the first camera 14 with respect to each grid box of the second camera 16 is stored as the probability map of the second camera 16 in the map storage section 44M.

In next step S120, the first camera 14 and the second camera 16 are matched using the probability map of the first camera 14 and the probability map of the second camera 16, stored in the accumulating device 44. After that, the CPU 32 ends the processing routine.

Matching the first camera 14 and the second camera 16 is the process of identifying a common positional relationship in images captured by the first camera 14 and the second camera 16. In short, this is the process of identifying a pair of grid boxes common to the first camera 14 and the second camera 16. Specifically, a pair of grid boxes that are a grid box set in the first camera 14 and a grid box set in the second camera 16 with the highest probability is identified as a pair of grid boxes that have a common positional relationship. In this case, a pair of grid boxes may be identified using one or both of the probability map of the first camera and the probability map of the second camera 16. For example, a first group of grid pairs with high probabilities based on the probability map of the first camera 14 and a second group of grid pairs with high probabilities based on the probability map of the second camera 16 are obtained, and, among the first group and the second group, a pair of grid boxes with the highest probability may be identified as a pair of grid boxes with a common positional relationship.

With the above processing, a common area may be identified between an area of an image captured by the first camera 14 and an area of an image captured by the second camera 16 in accordance with the degree of certainty of a user being observed. Thus, it is unnecessary to make detailed initial settings such as setting a corresponding positional relationship between the first camera 14 and the second camera 16.

The probability map of the first camera 14 and the probability map of the second camera 16 obtained as described above tend to have higher probabilities for grid boxes corresponding to an arbitrary area where a user stays. For example, it is conceivable that a user or a store clerk who receives payment at a facility such as a store stays at a place where the payment is settled. For example, it is assumed that the first camera 14 is capturing an image of a certain area in a store, and the second camera 16 is also capturing an image of an area that overlaps the foregoing area. At this time, it is assumed that a payment settlement place (in other words, a place where a cash register is located) is included in an image capturing area of the second camera 16, but is outside an image capturing area of the first camera 14. In such a case, when there is a person in an overlapping area between the first camera 14 and the second camera 16, an image of this person is captured at that position in the image captured by the first camera 14. In an image captured by the second camera 16 at the same time point, a person or people are detected not only at a corresponding position in the overlapping area, but also around the payment settlement place. Such a place where there is constantly a person or people, which is actually not the overlapping area, may be the cause of a detection error that the co-presence probability is detected to be high. It is thus preferable to lower the probability P in an area where a user is expected to stay. In other words, it is assumed that a person moves across multiple cameras, and when the object of interest whose movement is to be detected (for example, a customer in a store in the case of the exemplary embodiment) is simultaneously detected in images captured by the cameras, that position of the object of interest is used to identify the positional relationship between the cameras. By excluding an error in detection of the probability based on an object (such as a store clerk in the case of the exemplary embodiment) assumed to stay in a narrow area, the accuracy of position identification may be enhanced in the exemplary embodiment.

When tracking data, which is the movement track of a user, indicates that the user's positions in time series are extremely distant from each other, it is highly likely that this result has been influenced by noise in image processing or the like, and it is preferable to exclude such a movement track including the extremely distant positions in time series from probability calculation. When tracking data, which is the movement track of a user, indicates that the user's position remains unchanged for a long period of time, it is highly likely that this result has been influenced by noise in image processing or the like, and it is preferable to exclude such a movement track from probability calculation.

In the first exemplary embodiment, before generating a probability map, pre-processing is conducted for lowering the probability P in an area where a user is predicted to stay, and for excluding a movement track including the possibility of noise in tracking data from probability calculation.

Figure 7:
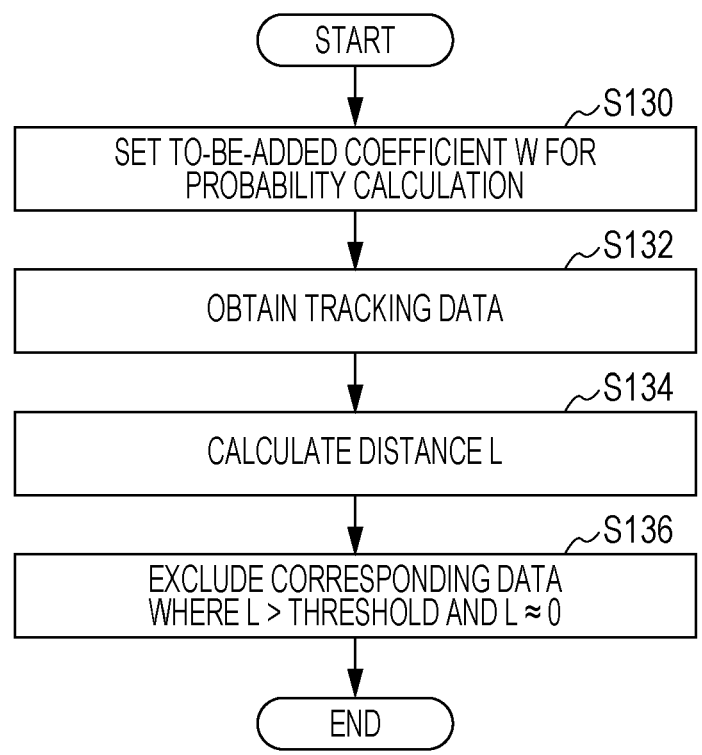
FIG. 7 is a flowchart illustrating an example of the flow of pre-processing for generating a probability map according to the first exemplary embodiment.

FIG. 7 illustrates an example of the flow of pre-processing for generating a probability map. The processing routine illustrated in FIG. 7 executes processing between steps S108 and S110 illustrated in FIG. 3.

In the pre-processing illustrated in FIG. 7, the CPU 32 sets in step S130 a to-be-added coefficient W for probability calculation. The to-be-added coefficient W is a variable that indicates the variance U of a probability P for a grid box and is given when calculating the probability P. In next step S132, the CPU 32 obtains tracking data. In next step S134, the CPU 32 calculates the distance L between pairs of coordinates in the obtained tracking data. In next step S136, the CPU 32 makes settings to exclude data on position coordinates at which the distance L exceeds a predetermined threshold and data on position coordinates indicating that the user's position remains unchanged (L is substantially zero) for a long period of time, and ends the processing routine.

Doing so lowers the probability P for an area where a user is predicted to stay and excludes a movement track including the possibility of noise in tracking data from probability calculation.

Second Exemplary Embodiment

Next, a second exemplary embodiment will be described. Since the second exemplary embodiment is configured in the same manner as the first exemplary embodiment, like symbols refer to like parts, and detailed descriptions thereof are omitted. In the second exemplary embodiment, it is assumed that a distance between grid boxes, that is, the actual distance between grid boxes set in a captured image, is known in advance.

In the second exemplary embodiment, the CPU 32 derives the distance between the first camera 14 and the second camera 16 in the processing in step S120 illustrated in FIG. 3. Specifically, the CPU 32 extracts multiple grid pairs common to the first camera 14 and the second camera 16, which are identified in matching the first camera 14 and the second camera 16. For the extracted grid pairs, the CPU 32 derives the distance between the first camera 14 and the second camera 16 by conducting triangulation calculation, which is an example of the related art described in Japanese Unexamined Patent Application Publication No. 2013-168089 or the like, using the actual distance between known grid boxes.

In doing so, the process of measuring the distance between the first camera 14 and the second camera 16 may be omitted when installing the first camera 14 and the second camera 16.

Third Exemplary Embodiment

Next, a third exemplary embodiment will be described. Since the third exemplary embodiment is configured in the same manner as the first exemplary embodiment, like symbols refer to like parts, and detailed descriptions thereof are omitted.

The movement tracks (tracking) of a user may be connected by identifying a common area between an area of an image captured by the first camera 14 and an area of an image captured by the second camera 16, described in the above exemplary embodiment. In short, the movement track in an image captured by the first camera 14 and the movement track in an image captured by the second camera 16 may be connected using a probability map derived in the above exemplary embodiment.

Figure 10:
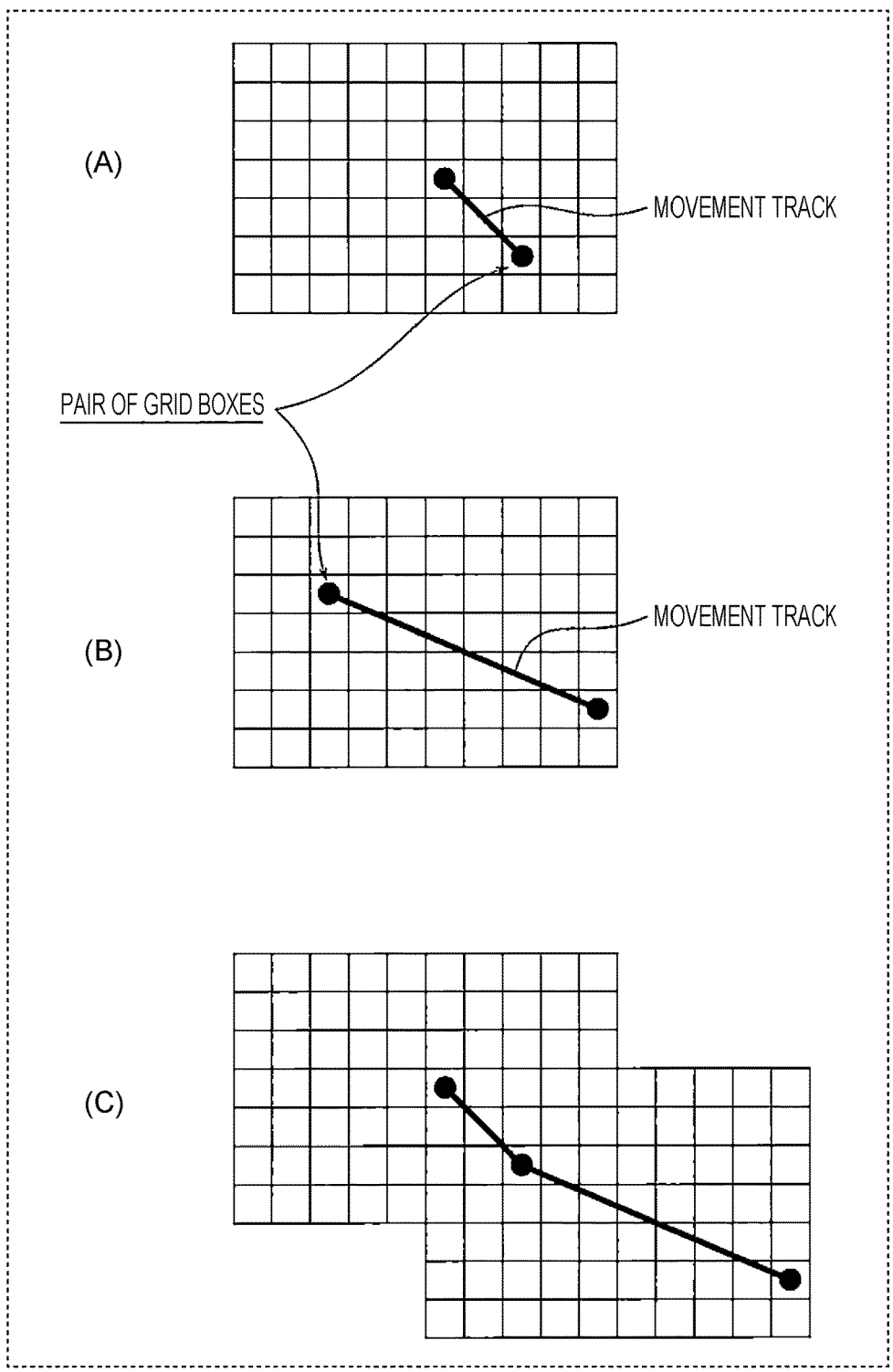
FIG. 10 is an image diagram illustrating the process of connecting movement tracks of each user obtained by the first camera and the second camera.

FIG. 10 illustrates the process of connecting the user's movement tracks (tracking). Part (A) of FIG. 10 illustrates a user's movement track included in an image captured by the first camera 14, and part (B) of FIG. 10 illustrates a user's movement track included in an image captured by the second camera 16. Part (C) of FIG. 10 illustrates the concept of connecting the movement tracks (tracking) when the user of the movement track obtained by the first camera 14 and the user of the movement track obtained by the second camera 16 are an identical user.

As illustrated in FIG. 10, the movement tracks of an identical user may be connected across images captured by multiple cameras by superimposing the images using a grid pair identified from the probability map. Doing so enables identification of the movement path of a person who moves across the first camera 14 and the second camera 16.

In the exemplary embodiment, the movement path of a person who moves across the first camera 14 and the second camera 16 is identified using a probability map derived in the first exemplary embodiment. Hereinafter, a path identifying apparatus that identifies the movement path of a person will be described in detail.

Next, the operation of the computer 30 functioning as the path identifying apparatus according to the exemplary embodiment will be described.

FIG. 11 illustrates an example of the flow a path identifying process performed by the computer 30, which is the control device 12 functioning as the path identifying apparatus, when the CPU 32 executes the control program 38. The CPU 32 executes the processing routine illustrated in FIG. 11 in response to an instruction given by the user or periodically.

First in step S140, the CPU 32 stores the probability maps of the first camera 14 and the second camera 16, which are derived by executing the same processing as steps S100 to S118 illustrated in FIG. 3. In short, the certainty of each of all grid boxes of the second camera 16 with respect to each grid box of the first camera 14 is stored as the probability map of the first camera 14, and the certainty of each of all grid boxes of the first camera 14 with respect to each grid box of the second camera 16 is stored the probability map of the second camera 16 in the map storage section 44M. The processing in step S140 is the process of deriving a probability map used in the process of identifying a path. The processing in step S140 is unnecessary when the probability maps have already been derived beforehand.

In next step S142, like steps S104 and S106 illustrated in FIG. 3, the CPU 32 obtains images captured by the first camera 14 and the second camera 16, and accumulates the movement tracks of users who are in the captured images in the accumulating device 44 (stores the movement tracks in the tracking data storage section 44T). Note that the processing in step S142 is the process of continuously accumulating the movement tracks as tracking data in the case of identifying a movement path including a user who moves in real time. To identify a user from the already-accumulated (already-stored) movement tracks, it is only necessary to obtain the data from the tracking data storage section 44T, and the processing in step S142 is unnecessary.

In next step S144, the CPU 32 sets a user R from among users observed by the first camera 14. In short, in step S144, the CPU 32 obtains tracking data of the first camera 14 from the tracking data storage section 44T, and extracts any of the obtained tracking data (total number Rmax) as tracking data of the user R in the first camera 14. In step S144, the CPU 32 sets the observation time of the tracking data of the user R as the observation time of the first camera 14.

In next step S146, the CPU 32 sets a user V from among users observed by the second camera 16. In short, in step S146, the CPU 32 obtains tracking data of the second camera 16 from the tracking data storage section 44T, and extracts any of the obtained tracking data (total number Rmax) as tracking data of the user V in the second camera 16. In step S146, the CPU 32 sets the observation time of the tracking data of the user V as the observation time of the second camera 16.

Next in step S148, the CPU 32 obtains a time range Tth where the observation time is common between the tracking data of the user R in the first camera 14, set in step S144, and the tracking data of the user V in the second camera 16, set in step S146. The time range Tth is a time range where, at the time the user R was observed by the first camera 14, the user V was observed by the second camera 16. In the time range Tth, it is highly likely that both the user R and the user V are commonly observed by the first camera 14 and the second camera 16. Therefore, the CPU 32 obtains the certainty of the user R and the user V being commonly observed by the first camera 14 and the second camera 16 over the time range Tth, thereby reducing the processing load, compared with the case of obtaining all observation times of the tracking data.

In next step S150, the CPU 32 obtains the identity Mrv indicating the certainty of the user R and the user V being an identical person commonly observed by the first camera 14 and the second camera 16 using the probability maps. The identity Mrv may be obtained using identity calculation using the following equations (1) and (2):

$$Pt = P(Ai|Bj) \cdot P(Bj|Ai) \qquad (1)$$

$$M = 1 - \prod_t (1 - Pt) \qquad (2)$$

Equation (1) calculates a probability Pt indicating the certainty of a user being present commonly at an image position (grid box Ai) of the first camera 14 and at an image position (grid box Bj) of the second camera 16 at a time t. Specifically, at the time t at a node of the tracking data, a probability P(Ai, Bj) of a first term indicating the certainty of a person who is in the grid box Ai of the first camera 14, obtained from the probability map of the first camera 14, being in the grid box Bj of the second camera 16, is multiplied by a probability P(Bj, Ai) of a second term indicating the certainty of a person who is in the grid box Bj of the second camera 16, obtained from the probability map of the second camera 16, being in the grid box Ai of the first camera 14 to obtain the probability Pt. Note that the time t is a time within the time range Tth obtained in step S148.

Equation (2) obtains the identity Mrv indicating the certainty of the user R, observed on the movement path based on the tracking data of the first camera 14, and the user V, observed on the movement path based on the tracking data of the second camera 16, being an identical person. Specifically, the direct product of the probability Pt at each time t within the time range Tth, obtained by equation (1), is calculated. The obtained identity Mrv is stored in association with a combination of the user R (tracking data) of the first camera 14, set in step S144, and the user V (tracking data) of the second camera 16, set in step S146, in the accumulating device 44.

In next step S152, the CPU 32 determines whether the processing in steps S146 to S150 is completed for all users (tracking data) observed by the second camera 16. When it is determined negative in step S152, the CPU 32 returns to step S146 and executes the processing in steps S146 to S150 for an unprocessed user observed by the second camera 16. In contrast, when it is determined affirmative in step S152, the CPU 32 proceeds to step S154 and determines whether the value of the identity Mrv exceeds a predetermined threshold Mo (Mrv>Mo). The threshold Mo is a value obtained in advance by an experiment as the value of a determination reference for determining that the user R of the first camera 14 and the user V of the second camera 16 are an identical person.

When it is determined affirmative in step S154 (Mrv>Mo), the CPU 32 determines in step S156 that the user R and the user V are an identical person, and proceeds to step S160. When it is determined negative in step S154 (Mrv≤Mo), the CPU 32 determines in step S158 that the user R and the user V are different persons, and proceeds to step S160. Note that, in step S156, the CPU 32 stores the determination result in association with a combination of the tracking data of the user R of the first camera 14 and the tracking data of the user V of the second camera 16 in the accumulating device 44.

By the way, it is preferable that the user V, observed by the second camera 16 as a user common to the user R, observed by the first camera 14, be a single user. In short, it is preferable that the user R and the user V have a one-to-one correspondence. In step S154, when multiple combinations of the user R and the user V are determined as an identical person, the CPU 32 sets a combination with a high certainty of being an identical person from among the multiple combinations. For example, it is only necessary to add the process of setting a combination of the user R and the user V with the maximum value of the identity Mrv to step S154.

In next step S160, the CPU 32 determines whether the processing in steps S144 to S158 is completed for all users (tracking data) observed by the first camera 14. When it is determined negative in step S160, the CPU 32 returns to step S144 and executes the processing in steps S144 to S158 for an unprocessed user observed by the first camera 14. In contrast, when it is determined affirmative in step S160, the CPU 32 proceeds to step S162, connects the tracking data of the user R of the first camera 14 and the tracking data of the user V of the second camera 16, who are determined as an identical person, and ends the processing routine.

Figure 12A:
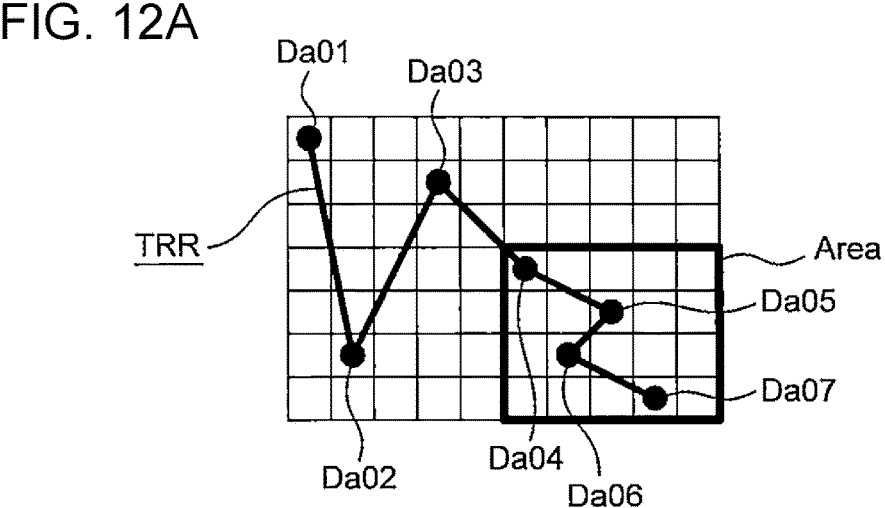
FIGS. 12A to 12C are image diagrams each illustrating the process of connecting detailed movement tracks of each user obtained by the first camera and the second camera.
Figure 12B:
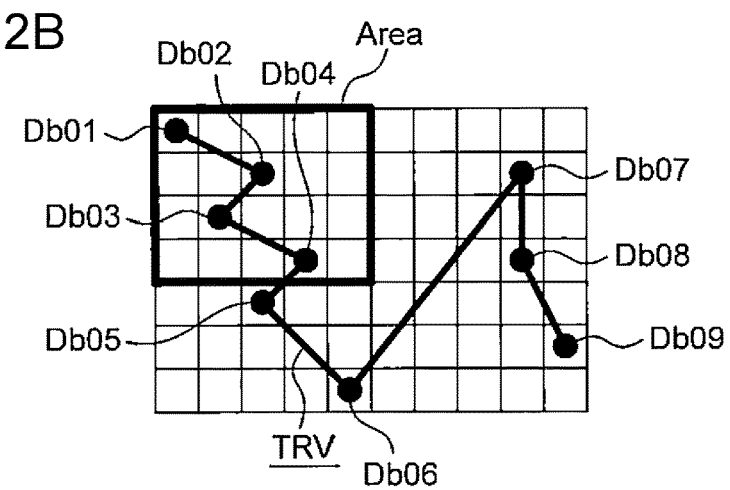
Figure 12C:
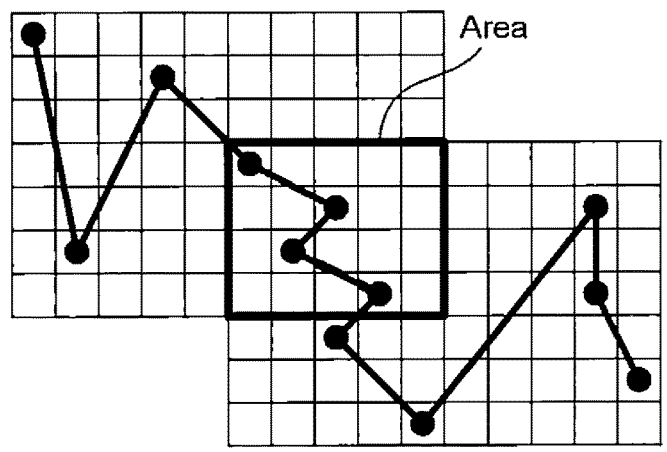

FIGS. 12A to 12C illustrate the process of identifying the movement path of a user by connecting the user's movement tracks (tracking). FIGS. 12A to 12C illustrate FIG. 10 in more detail. FIG. 12A illustrates a movement track TRR of the user R, included in an image captured by the first camera 14. FIG. 12B illustrates a movement track TRV of the user V, included in an image captured by the second camera 16. FIG. 12C illustrates a movement path TR of a person who moves across the image capturing ranges of the first camera 14 and the second camera 16 by connecting the movement tracks of the user R and the user V.

As illustrated in FIG. 12A, the user A moves from node (such as the head position) Da01 to node Da07 in units of grid boxes. As illustrated in FIG. 12B, the user V moves from node (such as the head position) Db01 to node Db09 in units of grid boxes. The example illustrated in FIGS. 12A and 12B illustrate the movement track TRR based on the tracking data of the user R in the first camera 14 and the movement track TRV based on the tracking data of the user V in the second camera 16, where the observation times include the common time range Tth. FIG. 12A illustrates the movement track TRR of the user R in the first camera 14 within the time range Tth as the range from node Da04 to node Da07, and FIG. 12B illustrates the movement track TRV of the user V in the second camera 16 as the range from node Db01 to Db04. Note that a common area may be identified between an area of an image captured by the first camera 14 and an area of an image captured by the second camera 16 in accordance with the degree of certainty of a user being observed. This common area is denoted as area Area.

Here, when the value of the identity Mrv based on the movement track TRR included in the area Area illustrated in FIG. 12A and the movement track TRV included in the area Area illustrated in FIG. 12B exceeds the threshold Mo, it is determined that the user R and the user V are an identical person. Therefore, the movement path TR of the users identified as an identical person may be formed by superimposing and connecting the overlapping portions of the movement track TRR and the movement track TRV. The movement path TR may be identified as the movement path of a person who moves across the image capturing ranges of the first camera 14 and the second camera 16.

As has been described above, according to the exemplary embodiment, a common and identical person may be identified on the basis of the movement track of the user R, obtained by the first camera 14, and the movement track of the user V, obtained by the second camera 16, from the degree of certainty (probability map) of a user commonly observed by multiple cameras. Since an identical person is identified using a probability map, load on the process of identifying the movement path of a user who moves across the image capturing ranges of the first camera 14 and the second camera 16 may be alleviated.

Although the exemplary embodiment has discussed the case of connecting items of tracking data after storing the probability maps in the accumulating device 44 and storing the tracking data in the accumulating device 44, the present disclosure is not limited to this case. For example, the probability maps and the tracking data may be stored in advance in a storage device such as a hard disk drive (HDD) or a non-volatile flash memory, and the tracking data may be connected using the probability maps and the tracking data read from the storage device. In this case, step S140 illustrated in FIG. 11 may be omitted, and it is only necessary to execute the process of reading the probability maps or tracking data from the storage device in each of steps S144 to S150.

Fourth Exemplary Embodiment

Next, a fourth exemplary embodiment will be described. Since the fourth exemplary embodiment is configured in the same manner as the third exemplary embodiment, like symbols refer to like parts, and detailed descriptions thereof are omitted.

In the third exemplary embodiment, the movement path of a user who moves across the first camera 14 and the second camera 16 is identified by connecting the movement track in an image captured by the first camera 14 and the movement track in an image captured by the second camera 16. In this case, the identity Mrv using each probability map is obtained for all cameras capturing images of the interior of the facility, and a common and identical user is identified. Thus, the amount of calculation increases as the number of cameras increases. However, the probability that there is an identical person common to cameras capturing images of the interior of the facility is sometimes low. In this exemplary embodiment, the amount of calculation is reduced by suppressing calculations when the probability that there is an identical person common to the cameras is low.

The exemplary embodiment will discuss the case where the first camera 14, the second camera 16, and a third camera (not illustrated) capture images of the interior of the facility 20. In the following description, the third camera (not illustrated) may be given the symbol 18 and described as the third camera 18.

Next, the operation of the computer 30 functioning as the path identifying apparatus according to the exemplary embodiment will be described.

Figure 13A:
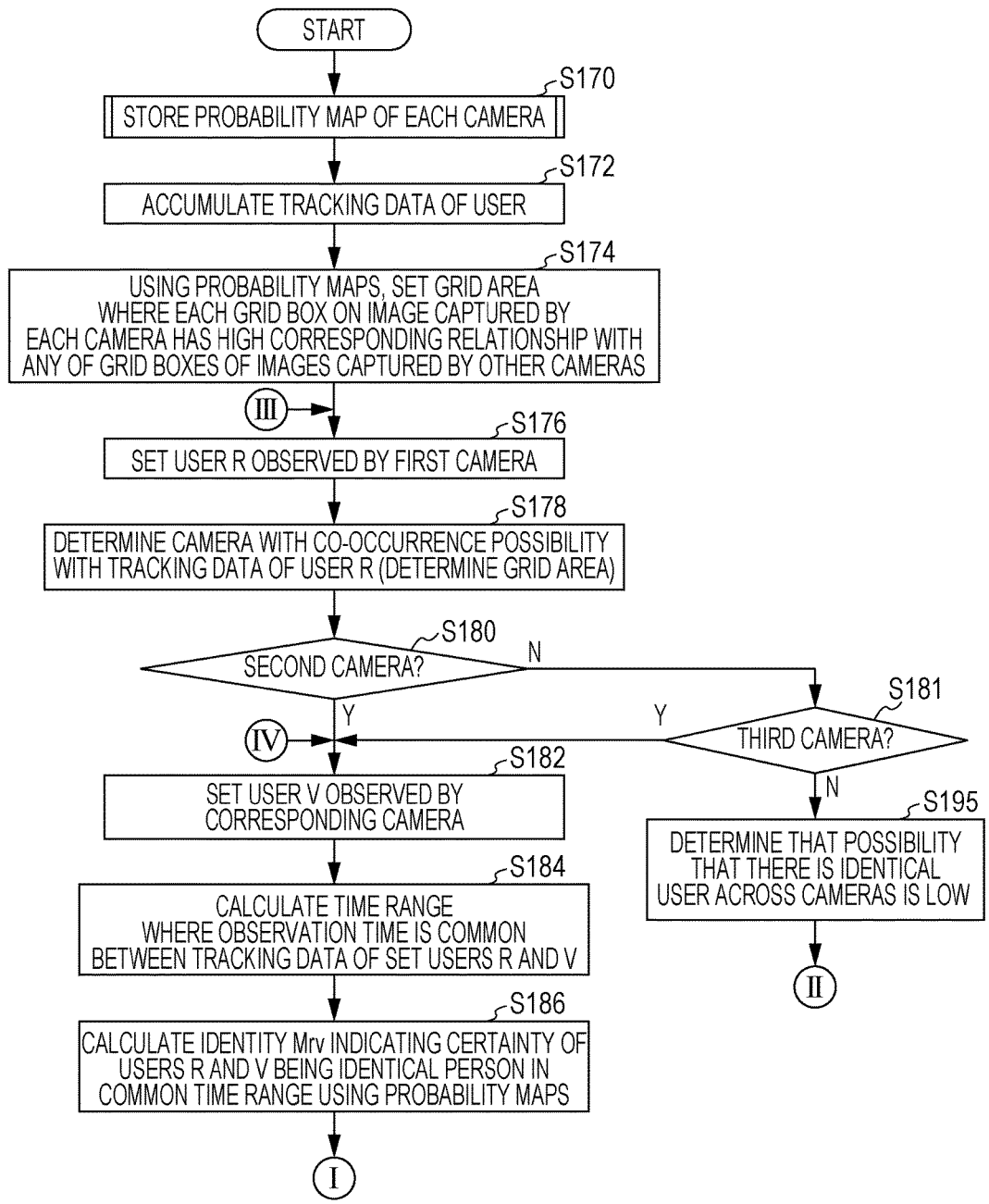
FIGS. 13A and 13B are a flowchart illustrating an example of the flow of a path identifying process according to a fourth exemplary embodiment.
Figure 13B:
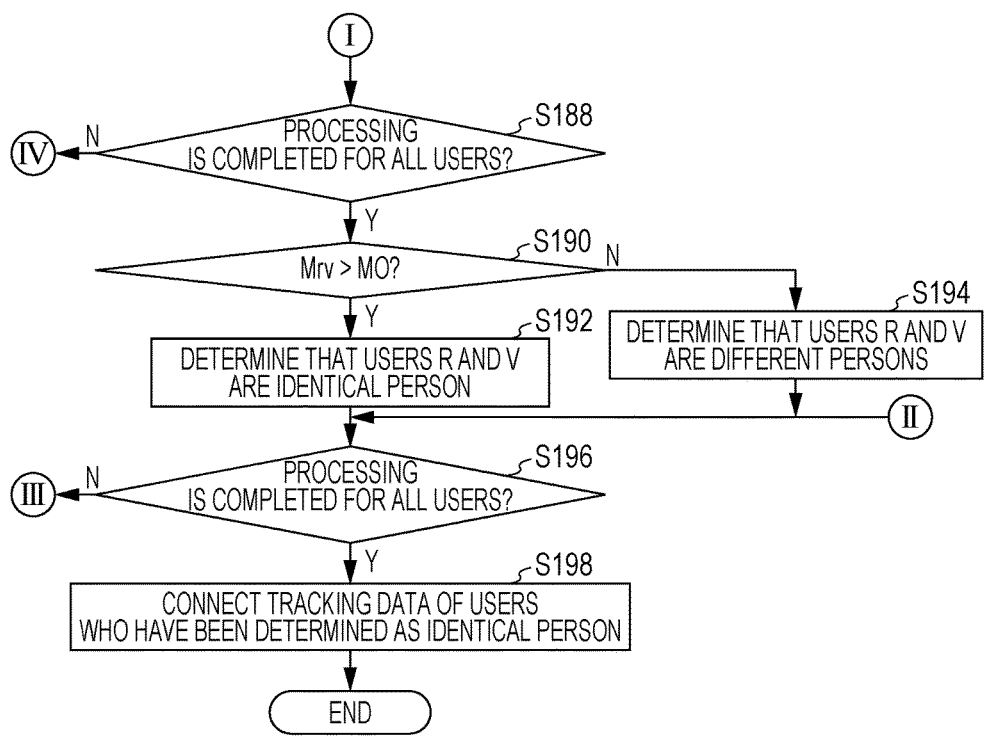

FIGS. 13A and 13B illustrate an example of the flow of a path identifying process according to the exemplary embodiment.

First in step S170, like step S140 in FIG. 11, the CPU 32 stores the probability maps of the first camera 14, the second camera 16, and the third camera 18. In next step S172, like step S142 illustrated in FIG. 11, the CPU 32 obtains images captured by the first camera 14, the second camera 16, and the third camera 18, and accumulates the movement tracks of users who are in the captured images in the accumulating device 44 (stores the movement tracks in the tracking data storage section 44T).

In next step S174, for each camera, the CPU 32 sets, among grid boxes on an image captured by that camera, a grid area that has a high corresponding relationship with any of grid boxes on an image captured by another camera. For example, for the first camera 14, in order to obtain a corresponding relationship with each of the second camera 16 and the third camera 18, the CPU 32 obtains a grid box whose probability P exceeds a predetermined threshold using a probability map of the first camera 14 with respect to the second camera 16. The CPU 32 sets an area including the obtained grid box whose probability P exceeds the threshold as a grid area 17GR of the first camera 14 with a high corresponding relationship with the second camera 16. Next, the CPU 32 obtains a grid box whose probability P exceeds the predetermined threshold using a probability map of the first camera 14 with respect to the third camera 18. The CPU 32 sets an area including the obtained grid box whose probability P exceeds the threshold as a grid area 19GR of the first camera 14 with a high corresponding relationship with the third camera 18.

Figure 14:
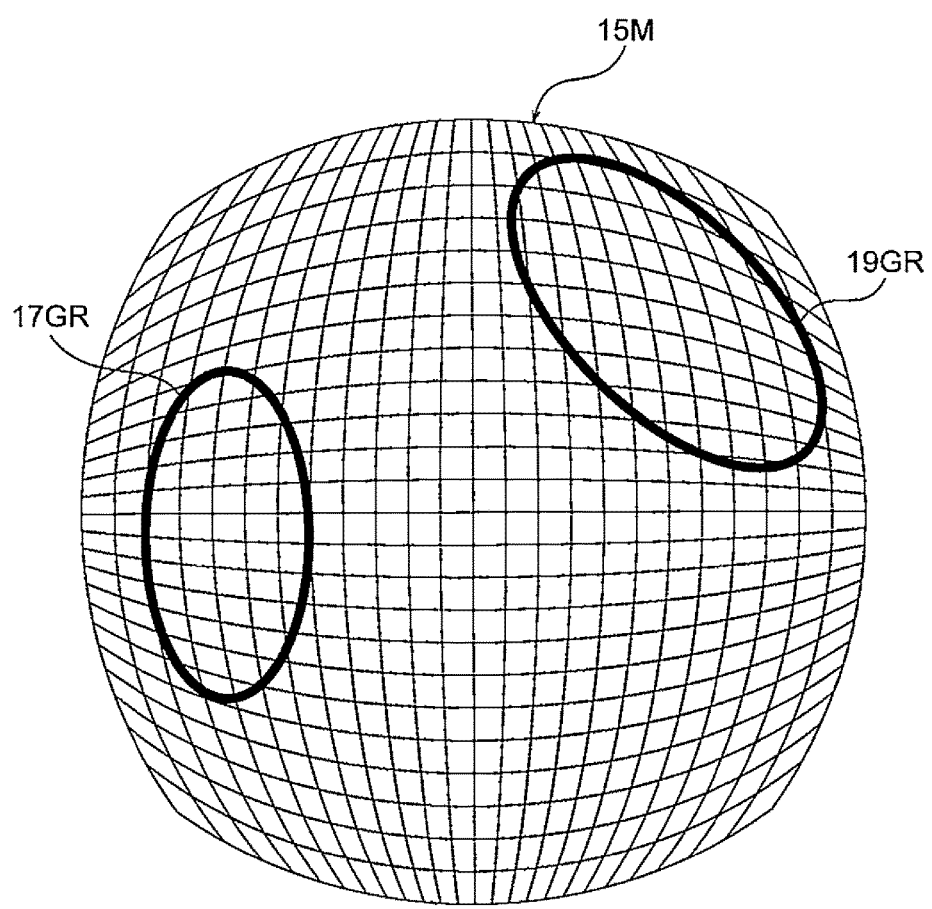
FIG. 14 is an image diagram illustrating an example of grid areas with a high corresponding relationship with the second camera and a third camera in a grid frame set to an image captured by the first camera.

FIG. 14 illustrates exemplary grid areas each with a high corresponding relationship with the second camera 16 or the third camera 18 in the grid frame 15M set to the image captured by the first camera 14.

As illustrated in FIG. 14, among grid boxes G of the first camera 14, those not included in the grid area 17GR, which has a high corresponding relationship with the grid boxes of the second camera 16, and those not included in the grid area 19GR, which has a high corresponding relationship with the grid boxes of the third camera 18, have extremely low probability of including the movement path of a user who moves across the first camera 14 and the second camera 16 or the first camera 14 and the third camera 18. For example, in the case of obtaining the identity Mrv of a user commonly observed by the first camera 14 and another camera, the amount of calculation may be reduced by obtaining the identity Mrv only when each node of the tracking data of the first camera 14 includes the grid area 17GR or 19GR.

Next, in step S176 illustrated in FIG. 13A, like step S144 in FIG. 11, the CPU 32 sets a user R among users observed by the first camera 14, and extracts tracking data of the user R. The CPU 32 also sets the observation time of the tracking data of the user R as the observation time of the first camera 14.

In next step S178, the CPU 32 determines a camera with a co-occurrence possibility with the tracking data of the user R. In other words, the CPU 32 executes grid area determination of determining a camera with a grid box having a high corresponding relationship with grid boxes included in the tracking data of the user R, obtained by the first camera 14, using the grid areas set in step S174. When the determination result in step S178 indicates the second camera 16, it is determined affirmative in step S180, and the CPU 32 proceeds to step S182. When the determination result in step S178 indicates the third camera 18, it is determined affirmative in step S181 after determining negative in step S180, and the CPU 32 proceeds to step S182. In contrast, when the determination result in step S178 indicates that the corresponding relationships with the second camera 16 and the third camera 18 are low, it is determined negative in steps S180 and S182, and the CPU 32 proceeds to step S195. In step S195, the CPU 32 determines that the probability that there is an identical user across the cameras is low, and proceeds to step S196.

Next in step S182, like step S146 in FIG. 11, the CPU 32 sets a user V among users observed by the second camera 16 or the third camera 18 determined as a corresponding camera in step S178. Next in step S184, like step S148 in FIG. 11, the CPU 32 obtains a time range Tth where the observation time is common between the tracking data of the user R in the first camera 14 and the tracking data of the user V in the corresponding camera (the second camera 16 or the third camera 18). In next step S186, like step S150 in FIG. 11, the CPU 32 obtains the identity Mrv indicating the certainty that the user R and the user V are an identical person observed commonly by the first camera 14 and the corresponding camera using the probability maps and equations (1) and (2).

In next step S188, like step S152 in FIG. 11, the CPU 32 determines whether all users observed by the corresponding camera are completely processed, and when it is determined negative, the CPU 32 returns to step S182. In contrast, when it is determined affirmative in step S188, the CPU 32 proceeds to step S190, and, like step S154 in FIG. 11, determines whether the value of the identity Mrv exceeds a predetermined threshold Mo (Mrv>Mo). When it is determined affirmative in step S190 (Mrv>Mo), like step S156 in FIG. 11, the CPU 32 determines in step S192 that the user R and the user V are an identical person, and proceeds to step S196. When it is determined negative in step S190 (Mrv≤Mo), like step S158 in FIG. 11, the CPU 32 determines in step S194 that the user R and the user V are different persons, and proceeds to step S196.

In step S196, like step S160 in FIG. 11, the CPU 32 determines whether all users observed by the first camera 14 are completely processed, and when it is determined negative, the CPU 32 returns to step S176. In contrast, when it is determined affirmative in step S196, the CPU 32 proceeds to step S198; like step S162 in FIG. 11, connects the tracking data of the user R of the first camera 14 and the tracking data of the user V of the corresponding camera, who are determined as an identical person; and ends the processing routine.

As has been described above, according to the exemplary embodiment, in the case of determining an identical person common to multiple cameras, load on the process of identifying the movement path of a user who moves across the multiple cameras may be alleviated by defining in advance an area with a high corresponding relationship with another camera for the probability map or the grid frame of each camera.

Although the exemplary embodiment has discussed the case of applying the exemplary embodiment to three cameras serving as an example of multiple cameras, the number of cameras is not limited to three, and the exemplary embodiment is applicable to four or more cameras.

Although the foregoing exemplary embodiments have described the case where the image capturing ranges of cameras have an overlapping portion by way of example, the foregoing exemplary embodiments are applicable to the case where the image capturing range of one camera includes the image capturing range of another camera. In other words, the exemplary embodiments are applicable to the case where the first camera 14 captures an image of the appearance of the interior of a facility, and the second camera 16 captures a detailed image of part of the interior of the facility, included in the image capturing range of the first camera 14.

Although the specific exemplary embodiments of the present invention have been described in detail above, the present invention is not construed to be limited to the exemplary embodiments, and various other embodiments may be implemented within the scope of the present invention.

Although each of the exemplary embodiments has discussed the processing done by executing the program stored in the ROM 36, the processing of the program may be realized by hardware.

Furthermore, the processing in each of the exemplary embodiments may be stored as a program in a storage medium such as an optical disk and distributed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A position identifying apparatus comprising:
   a plurality of cameras that capture images of predetermined image capturing ranges;
   a memory that accumulates in time series movement track information of a person included in the images captured by the plurality of cameras; and
   a processor programmed to
      derive, using the movement track information accumulated in the memory, for each image position in an image captured by any one of the plurality of cameras, a probability that, at a same time as a time at which a person is image-captured at the image position, a person is image-captured at each image position in an image captured by another one of the plurality of cameras, and
      identify, from the derived probability , an image position common to the images captured by the plurality of cameras.

2. The position identifying apparatus according to claim 1, wherein
   the image position is grid information indicating a position of each of grid boxes obtained by dividing the captured image in units of shapes whose vertical and horizontal sizes are determined in advance.

3. The position identifying apparatus according to claim 1, wherein
   the memory stores the probability derived by the processor.

4. A position identifying method comprising:
   accumulating in time series, in a memory, movement track information of a person included in images captured by a plurality of cameras that capture images of predetermined image capturing ranges;
   using the movement track information accumulated in the memory, for each image position in an image captured by any one of the plurality of cameras, deriving a probability that, at a same time as a time at which a person is image-captured at the image position, a person is image-captured at each image position in an image captured by another one of the plurality of cameras; and
   from the derived probability, identifying an image position common to the images captured by the plurality of cameras.

5. A non-transitory computer readable medium storing a program causing a computer to execute a process, the process comprising:
   accumulating in time series, in a memory, movement track information of a person included in images captured by a plurality of cameras that capture images of predetermined image capturing ranges;
   using the movement track information accumulated in the memory, for each image position in an image captured by any one of the plurality of cameras, deriving a probability that, at a same time as a time at which a person is image-captured at the image position, a person is image-captured at each image position in an image captured by another one of the plurality of cameras; and
   from the derived probability, identifying an image position common to the images captured by the plurality of cameras.

6. The position identifying apparatus according to claim 1, wherein
   the processor is further programmed to
      calculate, on the basis of the derived probability , for each person included in the images captured by the plurality of cameras, a probability of being an identical person, and
      identify a movement path of a person who moves across the plurality of cameras by connecting, on the basis of the calculated probability, movement track information obtained by a camera that captures an image of a person whose probability of being an identical person exceeds a predetermined threshold.

7. The path identifying apparatus according to claim 6, wherein
   the processor calculates the probability of being an identical person at a time common to movement track information of each person included in the images captured by the plurality of cameras.

8. A non-transitory computer readable medium storing a program causing a computer to execute a process, the process comprising:
   using movement track information, accumulated in time series, of a person included in images captured by a plurality of cameras that capture images of predetermined image capturing ranges, for each image position in an image captured by any one of the plurality of cameras, on the basis of a derived probability that, at a same time as a time at which a person is image-captured at the image position, a person is image-captured at each image position in an image captured by another one of the plurality of cameras, calculating, for each person included in the images captured by the plurality of cameras, a probability of being an identical person; and
   identifying a movement path of a person who moves across the plurality of cameras by connecting, on the basis of the calculated probability of being an identical person, movement track information obtained by a camera that captures an image of a person whose probability of being an identical person exceeds a predetermined threshold, wherein
   the process further comprises determining that the probability of being the identical person exceeds the predetermined threshold based on overlapping first and second movement tracks of the person included in an overlapping area contained in both a first image from the one camera and a second image from the other camera.

* * * * *